(12) United States Patent
Eisner et al.

(10) Patent No.: US 12,310,385 B2
(45) Date of Patent: May 27, 2025

(54) PROCESS FOR PRODUCING PROTEIN PREPARATIONS FROM SUNFLOWER SEEDS AND PROTEIN PREPARATIONS PRODUCED THEREFROM

(71) Applicant: Fraunhofer-Gesellschaft zur Förderung der angewandten Forschung e.V, Munich (DE)

(72) Inventors: Peter Eisner, Freising (DE); Stephaine Mittermaier, Freising (DE); Andreas Stäbler, Freising (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 936 days.

(21) Appl. No.: 17/293,966

(22) PCT Filed: Nov. 14, 2019

(86) PCT No.: PCT/EP2019/081328
§ 371 (c)(1),
(2) Date: May 14, 2021

(87) PCT Pub. No.: WO2020/099565
PCT Pub. Date: May 22, 2020

(65) Prior Publication Data
US 2022/0007679 A1 Jan. 13, 2022

(30) Foreign Application Priority Data
Nov. 15, 2018 (DE) .................... 10 2018 128 667.8

(51) Int. Cl.
*A23J 3/14* (2006.01)
*A23J 1/14* (2006.01)

(52) U.S. Cl.
CPC .. *A23J 3/14* (2013.01); *A23J 1/14* (2013.01)

(58) Field of Classification Search
CPC ...................................................... A23J 1/14
See application file for complete search history.

(56) References Cited

U.S. PATENT DOCUMENTS

| | | | | |
|---|---|---|---|---|
| 3,586,662 | A * | 6/1971 | O'Connor | A23J 1/14 530/377 |
| 3,622,556 | A * | 11/1971 | O'Connor | A23J 1/14 426/619 |
| 4,131,607 | A | 12/1978 | Sceaux | |
| 8,728,542 | B2 * | 5/2014 | Pickardt | A23J 1/142 424/725 |

OTHER PUBLICATIONS

Pickardt, Claudia Et al. "Isoelectric protein precipitation from mild-acidic extracts of de-oiled sunflower (*Helianthus annus* L.) press cake" European Food Reasearch and Tehcnologhy, Spirnger Berlin Heidelberg vol. 233, No. 1, May 25, 2011 (May 25, 2011), pp. 31-44 DOI: 10.1007/S00217-011-1489-6.

Alexandrino, Thais Dolfini et al. "Fractioning of the sunflower flour components: Physical, chemical and nutritional evaluation of the fractions" LWT—Food Science and Technology, Academic Press, United Kingdom, vol. 84, May 28, 2017 (May 28, 2017), pp. 426-432 DOI: 10, 1016/ J.LWT.2017.05.062.

* cited by examiner

*Primary Examiner* — Michele L Jacobson
(74) *Attorney, Agent, or Firm* — Renner, Kenner, Greive, Bobak Taylor & Weber

(57) ABSTRACT

In a process for producing protein preparations from sunflower seeds a protein-containing flour made of dehulled and deoiled sunflower seeds preferably having a protein solubility in water at pH 6 of >15% by mass and/or at pH 7 of >25% by mass relative to the protein content in the flour is subjected to at least one extraction step with water at a pH of more than 4 and less than 9 to obtain a liquid phase as an extract and a solids-rich phase as a raffinate. Before and/or during the extraction step the oxygen concentration in the water is reduced to a value <7 mg/l and/or an oxidation activity is reduced by addition of antioxidant components to the water.

After separation of the extract and the raffinate the extract is concentrated and/or dried to obtain a protein preparation having a high protein content. The process makes it possible to obtain qualitatively high-grade and sensorily appealing light-coloured protein preparations having a protein content greater than 75% by mass.

14 Claims, No Drawings

PROCESS FOR PRODUCING PROTEIN PREPARATIONS FROM SUNFLOWER SEEDS AND PROTEIN PREPARATIONS PRODUCED THEREFROM

TECHNICAL AREA

The invention relates to a process for obtaining functional protein preparations, in particular as protein ingredients for foodstuffs, pet food, cosmetics and technical products from seeds of sunflower kernels and protein preparations produced with the process.

RELATED ART

In view of the increasing scarcity of agricultural land and resources, vegetable protein preparations are becoming more and more important for feeding humans and for use in animal feed. The rising demand for high-grade foodstuffs and animal feed leads to a growing need for physiologically nutritionally and techno-functionally optimised protein preparations which can be produced simply and inexpensively.

One inexpensive source or protein for human food and animal feed is the press and extraction residue from processes for obtaining sunflower oil. Sunflower seeds are characterized by a firm, predominantly dark-coloured hull and an oil-rich fruit pulp. It is possible to separate the hulls in these raw materials before the oil recovery process, but partial or complete separation of the hulls has the effect of impairing the yield and speed of the oil pressing.

At present, the press and extraction residues produced during sunflower oil recovery are mostly used as animal feed. However, their use in animal feed is limited to a few percent despite their high protein content. This is because on the one hand the residue still consists of a very large fraction of the shells, which may reach a value of more than 25% by mass. Furthermore, the content of unwanted impurities is also very high, particularly the content of secondary plant substances such as polyphenols, tannins or phytic acid. These components can reach cumulative levels of several % by mass in the residues and very considerably impair the colour, flavour and digestibility of the proteins. Press cakes and extraction residues from processes for obtaining sunflower oil are therefore not suitable for producing high-grade protein ingredients for food or pet food without additional measures.

Sunflower seeds are typically processed with the primary intention of maximising oil yield. In this context, they are first cleaned and conditioned with regard to temperature and moisture. Most often, some of the shells are also removed. The raw material that has been prepared in this way then undergoes prior mechanical deoiling by pressing until the residual oil contents are between 8 and 20%. Then, the rest of the oil is extracted from the press cakes using hexane or another solvent such as ethanol or supercritical $CO_2$. A residue with an oil content of less than 3% by mass and a protein content between 40 and 55% by mass depending on the hull fraction is left.

According to the related art, sunflower seeds are usually pressed in the partially dehulled state. With partial dehulling, about 50% by mass of the hulls contained in the seeds is still present in the raw material before deoiling, which corresponds to a residual hull content of >15% by mass before pressing. In particular, according to the related art a hull fraction of at least 10% by mass is considered necessary for pressing to enable the oil to drain out of the press more easily, thereby increasing the speed of pressing and lowering costs.

In recent years attempts have also been made to obtain protein preparations from the residues of the sunflower oil in the form of protein flours or concentrates, and thus make them usable for foodstuff and high-grade animal feed applications. Some publications describe the production of protein preparations from sunflower seeds. These protein preparations are obtained by dry or wet treatment (using solvents for example), wherein the protein remains in the residue. However, the high percentage of undesirable impurities and the high raw fibre content limit the use of the residues for some food applications. Consequently, most protein flours and concentrates have a limited application spectrum and are only usable in low concentrations in animal feeds.

One of the features described in EP 2 885 980 B1 is a process for obtaining sunflower protein as a protein-rich foodstuff or animal feed. In order to produce the animal feed, partially dehulled sunflower kernels with a residual hull content >5% by mass are used. The seeds are pressed until an oil content ≥8% by mass to ≤18% by mass and a protein content from ≥30% to ≤45% relative to dry mass are reached. The influence of the residual hull content >5% by mass on the digestibility of the proteins is not discussed in the document. Moreover, it is to be assumed in this case that the high raw fibre content and the high chlorogenic acid content of the product can drastically limit acceptance of the product and thus also its usability as animal feed.

WO 2010097238 A2 describes a process for producing protein preparations from dehulled sunflower seeds. In this process, the sunflower seeds are dehulled until a residual hull content of ≤5% by mass dehulled remains, or dehulled sunflower seeds with a residual hull content of ≤5% by mass are prepared. A mechanical partial deoiling of the dehulled sunflower seeds is carried out by pressing until a fat or oil content of the dehulled sunflower seeds in the range between 10 and 35% by mass is reached. After one or more extraction steps have been carried out with at least one solvent, a defatted, protein-containing flour is obtained as a protein preparation. The protein preparation has highly advantageous properties in both appearance and function, which enable it is to be used directly in the area of human food or animal feed. Because of the low temperatures reached during pressing at below 80° C. and desolventising at below 90° C., this process makes it possible to preserve good techno-functional properties, maintain a low level of denaturisation and so ensure that very good digestibility and bioavailability are maintained. However, the low protein content from 55 to 65% by mass and the fraction of insoluble dietary fibre limits the usability of the preparations significantly, to such an extent that, for example, it is not possible to prepare protein-rich nutrition for athletes or clear drinks with these preparations.

Papers on preparations were published and protein preparations from sunflower seeds having a higher protein content of more than 70% by mass, in some cases over 90% by mass, also became available on the market some time ago. However, whereas their high protein content renders the application potential of such preparations significantly greater than that of the flours and concentrates, their low brightness values, determined on the basis of the L*a*b* colour space to have L* below 60, discolourations (green, beige-brownish colour shades), low protein solubility of <30% and flavour deficiencies, mean that even these preparations cannot be used to a great extent in applications with demanding sensory standards. Moreover, the processes are often very complex and involve several solvent extractions (for example Saeed and Cheryan, 1988, Sunflower Protein concentrates and isolates low in polyphenols and phytates, Journal of Food Science, 53 (4), 1127-1131) and/or aqueous extractions using various pH values a several different precipitation steps. Moreover, although the sunflower seeds are dehulled in this process, they are often also deoiled with solvents immediately afterwards, without mechanical partial deoiling, which further reduces the economic efficiency and industrial practicality of the processes.

In addition, other approaches are known which are designed to improve the solubility of the sunflower protein during the extractive recovery with the aid of the addition of common salt or other salts (Pickardt et al. 2009, Optimisation of mild-acidic protein extraction from defatted sunflower (*Helianthus annuus* L.) meal, Food Hydrocolloids, 23 (7), 1966-1973; Pickardt et al. 2015, Pilot plant preparation of light-coloured protein isolates from de-oiled sunflower (*Helianthus annuus* L.) press cake by mild-acidic protein extraction and polyphenol adsorption, Food Hydrocolloids, 44, 208-219). However, preparations of such kind have a very salty taste after the extraction in aqueous solutions which are concentrated with salt, so processes of this kind do not end in appealing preparations and also associated with very high costs.

OBJECT OF THE PRESENT INVENTION

The object of the present invention consisted in providing a cost-effective process for producing qualitatively high-grade and sensorily appealing protein preparations having good techno-functional properties from sunflower seeds having a protein content greater than 75% by mass. The preparations should be very appealing in terms of colour and taste and have good techno-functional properties. By virtue of their high protein content, they should also be usable in a wide range of applications in human foodstuffs and animal feeds.

DESCRIPTION OF THE INVENTION

The object is solved with the process according to claim 1 and the protein preparation related thereto. Advantageous variants of the process and of the protein preparation are the object of the dependent claims.

Surprisingly, with the process described hereafter it is possible to obtain at least two protein-rich fractions from sunflower seeds, one of which has a protein content greater than 75% by mass, in one manufacturing process. These two or more fractions satisfy high sensory requirements and in total contain more than 50% by mass, in advantageous variants more than 70% by mass, particularly advantageously more than 90% by mass of the protein from sunflower flour which is input into the process, wherein the sunflower flour has a protein content >35% by mass, preferably between 45 and 60% by mass, particularly advantageously between 48 and 57% by mass. The use of a high percentage of the proteins added in the process input enables a high degree of cost effectiveness compared with existing processes according to the related art, since in contrast to other processes a number of fractions can be used as protein-rich and sensorily appealing protein-rich foodstuff ingredients.

For the process according to the invention, first a protein-containing flour is provided which has been obtained from dehulled and deoiled sunflower seeds, wherein the deoiling comprises at least one mechanical step with a screw press or extruder and optionally a deoiling step with organic solvents such as ethanol or hexane, includes an oil content less than 8% by mass, advantageously less than 4% by mass, particularly advantageously less than 2% by mass (determined in each case using the Soxhlet method AOAC 963.15), and a hull content less than 10% by mass, advantageously less than 5% by mass, particularly advantageously less than 1% by mass or less than 0.1% by mass. The flour used is characterized by a protein content greater than 35% by mass, advantageously greater than 45% by mass, particularly advantageously greater than 48% by mass in dry mass (calculated according to Dumas § 64 LFBG L 01.00-60 with a proportional factor of 6.25), and by good protein solubility.

The flour used preferably has a protein solubility in water at pH 6 greater than 15% by mass, advantageously greater than 20% by mass, particularly advantageously greater than 25% by mass and/or a protein solubility in water at pH 7 greater than 25% by mass, advantageously greater than 30% by mass, particularly advantageously greater than 35% by mass relative to the protein content in the flour. In this context, the protein analysis to determine the protein solubility is carried out in conformity with the protein solubility determination according to C. V. Morr and the determination of the NSI value according to the official AOCS method (Ba 11-65; 1993) and AACC (46-23; 1990).

In order to be able to produce a flour with a protein solubility this high, particularly gentle conditions must be assured during the deoiling with screw presses or extruders and by means of solvents, and substantial reduction of unwanted impurities which may affect solubility. Surprisingly, however, it was found that a certain residual solvent content in the flour being used does not adversely affect protein solubility as expected, but certain quantities of solvent in the flour may instead have a positive effect on the subsequent further manufacturing process. In this context, solubility is particularly good with a residual content of at least one organic solvent (ethanol or propanol or methanol or hexane) greater than 0.001% by mass, advantageously greater than 0.01% by mass, particularly advantageously greater than 0.05% by mass or 0.1% by mass. It has been found that within this concentration range with an upper limit of about 1% by mass the solubility of the protein increases as the fraction of the solvent in the flour grows larger.

The flour particles are advantageously ground finely before the extraction. In this procedure, the D90 (90% of the mass of the particles are smaller than the stated particle size (determination by laser diffraction in n-butanol) in the range from 100 µm to 2500 µm, the D90 is advantageously smaller than 500 µm or smaller than 250 µm. The removal of the proteins from the flour may be speeded up further if the D90 is further reduced by further fine grinding, to less than 100 µm for example, particularly advantageously to smaller than 50 µm.

The high concentration of protein in the flour and preferably good solubility of the protein contained are advantageous, since an aqueous extraction step is carried out in a later stage of the process according to the invention. The high protein solubility is achieved by using a flour in which the temperatures during pressing, deoiling with organic solvents and desolventising are not set too high, so that the solubility of the proteins in the residue remains at a high level. If all these steps are conducted at temperatures lower than 120° C., preferably lower than 100° C., particularly advantageously lower than 80° C., thermal damage can be largely avoided and protein solubility maintained. For this reason, the flours used should advantageously be flours that were pressed, deoiled and desolventised at temperatures below the levels indicated.

As was noted previously, the protein-containing flour from deoiled sunflower seeds have a hull content less than 10% by mass, advantageously less than 5% by mass, or less than 1% by mass, particularly advantageously less than 0.5 or even 0.1% by mass. Particularly flours that contain no hulls or almost no hulls make it possible to use both the protein from the one or at least one of the extracts and the protein from the remaining raffinate for food applications after the single or repeated extraction step according to the invention.

At least one aqueous extraction is carried out with the sunflower flour obtained in the process according to the invention. For this, the flour and a defined quantity of water in excess (e.g. ratio of water to flour greater than 3:1, preferably greater than 5:1, particularly advantageously equal to or greater than 10:1) are mixed in a mixing vessel, kept in suspension for a period (advantageously between 10 and 60 minutes) and the suspension is subsequently separated with a continuously operating centrifuge, preferably with a decanter, into a liquid phase (extract) and a solid-rich phase (raffinate). The extraction, the separation of the two phases and the subsequent treatment and optional drying of both fractions is then conducted largely in the absence of oxygen and/or with the addition of antioxidants and/or reducing agents, with the result that after the extraction and optional drying a high-grade, light-coloured protein preparation with good techno-functional properties can be successfully obtained from both the extract (or one of the extracts) and from the raffinate with a sufficiently low hull content. At the same time, after analytically fine grinding both fractions have a L* value greater than 70, in advantageous variants greater than 80, particularly advantageously greater than 90 with reference to the L*a*b* colour space.

As noted previously, in order to achieve a simultaneous recovery of two high-grade protein preparations with a light-coloured appearance from the flour, it is necessary on the one hand for the flour to have a low hull content and a high protein content. With good protein solubility (solubility parameters as described previously) it is possible to improve the results further. On the other hand, the extraction according to the invention must be carried out in such manner that an oxidation of the components of the sunflower seeds is largely avoided, or the components which are readily oxidised must be separated from both fractions, for example in an aqueous pre-extraction of the flour.

This may be achieved particularly advantageously by conducting at least one aqueous extraction—preferably at pH values below 8, advantageously below 7, particularly advantageously below 6—in the absence of air, that is to say after creating a vacuum or after the addition of nitrogen, argon, $CO_2$ or other inert gases, and/or by the use of antioxidants and/or reducing agents which are approved for use with foodstuffs, such as sodium hydrogen sulfite, sodium sulfite or cysteine. If oxidation is substantially reduced or completely avoided, is has been found that both the protein fraction obtained from the extract and the raffinate have a L* value of over 70 after drying and analytically fine grinding. When oxygen is excluded entirely and antioxidants and/or reducing agents are used, it is also possible to achieve L* values above 80 in both fractions. This has not been achieved previously on the basis of the related art.

Extraction under reduced air pressure (vacuum) is advantageously performed in such manner that the pressure in the gas phase of the closed extraction container is adjusted to less than 200 mbar, preferably less than 100 mbar. In this context, the oxygen concentration in the water or the extract should be considered the target parameter. It is advantageous to attempt to lower the $O_2$ concentration to values below 7 mg/l, advantageously below 3 mg/l, particularly advantageously below 0.5 mg/l or preferably below 0.1 mg/l in the water used for the extraction or directly in the extract.

If it should prove impossible to achieve levels below these values in the vacuum, particular advantages in terms of the colour or lightness of the protein preparations have been found if most of the oxygen dissolved in the water used for the extraction is driven out of the water by blowing in highly concentrated (>90% by volume) nitrogen or argon and/or treating with ultrasound and thereby reducing the oxygen concentration to below the values indicated above. In this way, values for dissolved oxygen below 0.1 mg/l in some cases even below 0.05 mg/l, can be reached advantageously, which significantly limits the extent of the discolouration.

It is advantageous as an alternative or additional step to add ascorbic acid, citric acid or another colourless, water-soluble antioxidant and/or reducing agent such as sodium hydrogen sulfite, cysteine or the like to the water used for the extraction, and in this way also suppress a darkening action and so obtain light-coloured preparations. Whether the addition of antioxidants and/or reducing agents is sufficient to suppress the oxidation, or whether the additional measures described above for reducing the oxygen concentration further are necessary may be implemented variably depending on the desired result. It was further found, surprisingly, that some functionalities such as the solubility and emulsification behaviour of the preparations were improved by the addition of reducing agents.

In order to carry out the process the methods identified for preventing oxidation are ideally combined with each other. In this way, it is possible to reduce the oxygen content and the oxidative potential in the extract cumulatively to such a degree that it is no longer necessary to lower the pH value to below the level 7 during the extraction to avoid oxidising effects. Surprisingly, the pH value can be raised to higher than 7.5 with concentrations of dissolved $O_2$ of less than 1 mg per litre of extract without having to take into account a significant reduction of the light appearance of the dried and ground preparation (to L* values below 70). This in turn enables a significant increase in the protein yield in the extract, because at higher pH values a considerably higher percentage of the protein is able to pass into the extract phase.

In comparison, it has been found that the colour of the preparations becomes considerably darker when a pH value of 7.5 or higher is selected for the extraction without the measures described. In a variant of the process according to the invention in which measures described above are combined, i.e., after the oxygen is blown out with nitrogen for example (nitrogen content greater than 90% by volume) or argon and addition of e.g. 0.01 to 1 g ascorbic acid and/or 0.01 to 1 g cysteine or cystine per litre of water for the extraction it was found that it is still possible to obtain light-coloured protein preparations even when the pH value in the extract is adjusted to values higher than 8.5, if the extract undergoes ultrafiltration and/or diafiltration. A particularly light-coloured product can also be observed after the pressure is reduced during the extraction to values below 50 mbar. The combination of little or no oxygen in the extract, the addition of antioxidants and/or reducing agents and the use of ultrafiltration, and advantageously diafiltration of the extract as well, has been shown to be a particularly efficient process combination for ensuring that the protein fraction recovered from the extract after drying is also colour-fast during storage, that is to say no greying or other form of dark discolouration takes place during storage.

It has been found that even a prior treatment of the flour to reduce its air and/or oxygen content brings further advantages, particularly if most of the oxygen has already been removed from the water used for the extraction. Thus it was revealed that it is possible to obtain lighter coloured protein preparations from sunflower flour that had been treated with a vacuum below 200 mbar, advantageously below 50 mbar, or by blowing in nitrogen (or another gas suitable therefor) before it was introduced into the extraction, than if air contained in the volume was not previously removed from the flour. Preferably, the partial oxygen pressure in the flour should be reduced to less than 50 mbar, more preferably less than 20 mbar, particularly advantageously less than 10 mbar.

After the oxygen has been completely or partially separated from the water, wherein the process may also be supported by warming the oxygen-containing water to temperatures above 20° C., advantageously above 40° C., particularly advantageously above 50° C. before or during the extraction, the pH value may be adjusted to between 4 and 9 during the extraction operation according to the invention. This may be determined by the content of oxygen in the water but also optimised with regard to the desired separation result. For oxygen contents above 5 mg/l, the pH value is below 6.5, advantageously below 6 according to the invention. For oxygen contents between 1 and 5 mg/l, the pH may be adjusted to values up to 7.5, below 0.1 mg/l values as high as 9 are possible.

However, this does not mean that the highest possible pH values should be selected in any case if the oxygen content is lower than the values indicated. Rather, it is possible for a low $O_2$ value, even below 0.1 mg/l to be set, and for antioxidants and/or reducing agents to be used as well, and still select a pH value of 6 regardless of those measures in order to obtain specific properties, a defined protein composition or a particularly light colouration. Since only the albumins go from sunflower seeds into solution at pH 6, it may thus be advantageous to adjust the pH to 6 and only recover the albumins.

In a particularly advantageous variant of the process, the pH value is adjusted by the antioxidants added, such as ascorbic acid for example.

In the process according to the invention, the extraction is preferably carried out with a flour that was comminuted to a defined particle size distribution before the extraction and to which a certain quantity of water is added for the extraction. A separation of raffinate and extract is carried out after the extraction. For more complete extraction of protein, further aqueous extraction is advantageously carried out with the raffinate. After at least one separation of the extract and the raffinate, the raffinate undergoes a drying and optionally a grinding operation, in order to obtain a preferred particle size distribution as described previously with reference to the preferred grinding of the flour. A large percentage of sugars and other compounds with correspondingly small molecular size is preferably removed from the extract, either by ultrafiltration or diafiltration (or both), or the proteins are concentrated by precipitation, preferably at the isoelectric point of the proteins, and/or ultrafiltration. The concentrated protein is then stabilised, by drying or freezing for example, and if necessary subsequently adjusted to the particle size distribution identified above by grinding.

In this context, the protein preparation obtained from the raffinate has a protein content more than 25% by mass, advantageously more than 40% by mass, particularly advantageously more than 50% by mass and a sugar content (total of mono-, disaccharides) less than 6% by mass, advantageously less than 1% by mass, particularly advantageously less than 0.5% by mass. The protein fraction obtained from the raffinate also contains a quantity of chlorogenic acid less than 1% by mass, advantageously less than 0.5% by mass, particularly advantageously less than 0.1% by mass.

Compared with previously known dehulled flours with similar protein contents, the advantage of such a low concentration of chlorogenic acid, less than 0.1% by mass in conjunction with a relatively high protein content of preferably more than 50% by mass in the protein preparation recovered from the raffinate is that no discolouration occurs when a neutral or alkaline pH value is stet in a human food application or a cosmetics application or in pet food, or if the product is stored for a prolonged period. If such pH values are used with conventional flours according to the related art, or if the flours are stored for such long periods, discolouration is unavoidable.

When reduced oxygen and minimised oxygen extraction conditions are applied, this surprisingly makes it possible to produce a high-grade, light-coloured preparation from the raffinate and at the same time obtain an extract from which a neutral and light-coloured protein concentrate with a protein content of more than 75% by mass or even a protein isolate with a protein content of more than 90% by mass in particular by ultrafiltration and/or diafiltration and/or precipitation.

In this context too, the advantage of reducing the oxygen content and/or reducing the oxidation according to the invention is apparent. When these measures are selected, it is possible to remove sugars and other compounds with low molecular mass on the one hand and proteins with a molecular mass greater than 1000 Da on the other hand very much more effectively by ultrafiltration than if they were not selected. This is not possible with membrane separation when the oxidation limiting measures according to the invention are not selected. The process according to the invention also enables adsorbers to be used more easily to separate unwanted components out of the extract. Since the environment is largely oxidation-free, fewer proteins are deposited on the surfaces of the adsorbents.

It has been found that it is possible to obtain very light-coloured protein preparations with L* values higher than 70, advantageously higher than 80, even from dark deoiled flours which may have a hull content up to almost 10%.

With the suggested process, a preparation with the following properties is obtained from the extract or at least one of the extracts:
Protein content greater than 75% by mass, preferably greater than 80% by mass particularly preferably greater than 90% by mass
Light-coloured visual appearance with L* values from the L*a*b* colour space higher than 70, advantageously higher than 80, particularly advantageously higher than 90
Emulsifying capacity greater than 200, advantageously greater than 400, particularly advantageously greater than 500 ml oil/g protein,
Solubility of proteins at pH 7 more than 10% by mass, preferably more than 30% by mass, particularly advantageously more than 40% by mass or 50% by mass relative to the protein content in the preparation
Preferably a particle size distribution with a D90 value (quantity of the particles below the size is equal to 90%): smaller than 500 μm, advantageously smaller than 250 μm, particularly advantageously smaller than 100 μm.

From the raffinate, a preparation is obtained with the following properties:

Protein content greater than 25% by mass, advantageously greater than 40% by mass, particularly advantageously greater than 50% by mass Light-coloured visual appearance with L* values from the L*a*b* colour space higher than 70, advantageously higher than 80, particularly advantageously higher than 90

Emulsifying capacity greater than 250, advantageously greater than 400, particularly advantageously greater than 500 ml oil/g protein Solubility of proteins at pH 7 more than 5% by mass, preferably more than 20% by mass, particularly advantageously more than 30% by mass relative to the protein content in the preparation Water binding capacity >1 g per g dried raffinate Preferably a particle size distribution with a D90 value: smaller than 1000 μm, advantageously smaller than 500 μm, particularly advantageously smaller than 250 μm Preferably a polyphenol content in the raffinate <1% by mass, advantageously <0.5% by mass, and particularly advantageously <0.1% by mass (determination method: Weisz et al. 2009, Identification and quantification of phenolic compounds from sunflower (*Helianthus annuus* L.) kernels and shells by HPLC-DAD/ESI-MS, Food Chemistry, 115 (2), 758-765)

Preferably a residual content of organic solvent <50 mg/kg, particularly advantageously <10 mg/kg.

In summary, the following process steps are carried out as part of the suggested process:

1) Provision of protein-containing flour from deoiled sunflower seeds with a protein content >35% by mass, oil contents lower than 8% by mass, advantageously lower than 4% by mass, particularly advantageously lower than 2% by mass (Soxhlet method AOAC 963.15) and hull contents lower than 10% by mass, advantageously lower than 5% by mass, particularly advantageously lower than 1% by mass or lower than 0.1% by mass, preferably with a protein solubility at pH 6 greater than 15% by mass, advantageously greater than 20% by mass relative to protein in the flour and/or a protein solubility in water at pH 7 greater than 25% by mass, advantageously greater than 30% by mass, particularly advantageously greater than 35% by mass relative to the protein in the flour 2) Extraction of the flour with water in the pH range above 4, advantageously above 5, particularly advantageously above 6 but below 9

3) Prior or concurrent reduction of the oxygen concentration in the water to values lower than 7 mg/l, advantageously lower than 2 mg/l, particularly advantageously lower than 0.5 mg/l or lower than 0.1 mg/l and/or reduction of the oxidation activity by one or more of the following steps:
   a. Reducing the air pressure in the extraction containers to below 200 mbar, preferably below 100 mbar and/or
   b. Adjusting the temperature of the water that is to be used for the extraction to values above 20° C., advantageously above 40° C., particularly advantageously above 50° C., allowing dissolved oxygen to escape, and/or
   c. Blowing in nitrogen, $CO_2$, argon or other inert gas with a concentration above 90% by volume, advantageously above 99% by volume, by feeding into the water used for the extraction, which is advantageously warmed to above 20° C. or into the extract, or by bringing into contact with the water or the extract by passing nitrogen, $CO_2$, argon or another inert gas over the surface of the water/extract, so that nitrogen, $CO_2$, argon or the inert gas displaces that oxygen dissolved in the water/extract and in the case of nitrogen forms a $N_2$ concentration greater than 10 mg/l, advantageously greater than 15 mg/l, particularly advantageously greater than 20 mg/l, and/or
   d. Adding components with oxidising and/or reducing action (for example citric acid, ascorbic acid, sulfites, cysteine or other) before or during the extraction 4) Preferably: Adjusting the pH value in the water to values between 3 and 7.5, advantageously between 5.5 and 6.5

5) Separating solids from the extract

6) Preferably: Repeating the extraction operation at a higher pH value, particularly advantageously first extraction at pH values between 5.5 and 7 and seconds extraction at pH values between 7.5 and 9

7) Preferably: Concentrating the proteins in the extract by precipitation or ultrafiltration and/or diafiltration 8) Drying the extract and (optionally) the raffinate or the concentrated protein fractions if necessary and optional grinding to obtain a desired particle size distribution.

Execution Example

Execution

Sunflower flour from dehulled seed material with a hull content less than 1% by mass (protein content 55%; protein solubility 40%; oil content 2.5% by mass) is suspended in distilled water in a ratio of 1:10 (relative to the dry system of the flour). The water used for this was infused/flushed with nitrogen for 1 hour before it was used to drive out oxygen dissolved therein. Additionally, the pH value of the water was adjusted to 6 with ascorbic acid before the flour was added.

After the flour was added to the water, the pH value was re-adjusted to 6 and the water was then stirred for 30 min at room temperature.

After completion of this pre-extraction, the suspension was centrifuged for 10 minutes at 8570 g and 20° C.

The residue from centrifuging was extracted again at pH 6 as described above(2nd pre-extraction) and centrifuged as above. These pre-extractions serve among other things to remove unwanted phenolic components from the flour.

The residue from centrifuging was then again suspended in water in a ratio of 1:10 (relative to the dry mass) and adjusted to a pH value of 8.5 with caustic soda. Then, the suspension was stirred for 30 minutes at room temperature to extract the proteins. The water used for this was flushed with nitrogen for 1 hour before it was used.

At the end of the protein extraction, the residue (raffinate) and the supernatant (extract) were separated by centrifuging (10 min, 20° C., 8570 g). The raffinate was stabilised by freeze drying, while the last extract obtained was forwarded to a protein precipitation step.

For the protein precipitation, the pH of the extract was adjusted to 6 using ascorbic acid and stirred for 30 min at room temperature. The precipitated proteins were then obtained by centrifuging (10 min, 20° C., 8570 g). The protein curd obtained in this way was freeze-dried to stabilise it.

Products a) Protein Product from Extract Phase:
  Protein content: 85%
  Protein solubility (pH 7): 12%
  Emulsifying capacity: 230 mL oil/g
  L* value (L*a*b colour space): 80
b) Raffinate:
  Protein content: 40%
  Protein solubility (pH 7): 25%
  Water binding: 1.2 g/g
  Emulsifying capacity: 485 mL oil/g
  L* value (L*a*b colour space): 80
  Polyphenol content: 0.2% by mass

The invention claimed is:

1. A process for producing at least two protein preparations from sunflower seeds at the same time with at least the following steps:
  providing a protein-containing flour from dehulled and deoiled sunflower seeds with
    a hull content <10% by mass,
    an oil content <8% by mass,
    a protein content >35% by mass and
  performing at least one or more extraction steps with water at a pH of more than 4 and less than 9 with the protein-containing flour, after which one or more extraction step(s) a liquid phase is obtained as an extract and a solid-rich phase is obtained as a raffinate,
  separating the extract and the raffinate, and
  concentrating and/or drying the extract to obtain a first of said at least two protein preparations, and
  drying the raffinate to obtain a second of said at least two protein preparations,
  wherein before and/or during the one or more extraction step(s) an oxygen concentration in the water is reduced to a value <7 mg/l and/or an oxidation activity is reduced by the addition of antioxidant components to the water and/or components with reductive effect are added.

2. The process according to claim 1, characterized in that the protein-containing flour has a protein solubility in water at pH 6 of >15% by mass and/or at pH 7 of >25% by mass relative to the protein content in the flour.

3. The process according to claim 1, wherein the oxygen concentration in the water is reduced by carrying out the one or several extraction steps under air pressure that has been reduced to <200 hPa.

4. The process according to claim 1, wherein the oxygen concentration in the water is reduced by blowing nitrogen, carbon dioxide, argon or another inert gas with a concentration of more than 90% by volume into the water or bringing nitrogen, carbon dioxide, argon or another inert gas with a concentration of more than 90% by volume into contact with the water surface before and/or during the one or more extraction step(s).

5. The process according to claim 1,
  characterized in that
    the oxygen concentration in the water is reduced by a treatment with ultrasound.

6. The process according to claim 1, wherein the oxygen concentration in the water is reduced by adjusting a temperature of the water to a value above 20° C.

7. The process according to claim 1, characterized in that
  an oxygen content of the protein-rich flour is reduced before the one or more extraction step(s) by means of a vacuum or by blowing in carbon dioxide or an inert gas.

8. The process according to claim 7, characterized in that
  the oxygen content in the protein-rich flour is reduced to an oxygen partial pressure below 50 hPa in the protein-rich flour.

9. The process according to claim 1,
  characterized in that
    the one, or at least one of the one or more extraction steps is performed at pH values <8.

10. The process according to claim 1,
  characterized in that
    the separated extract is concentrated by ultrafiltration and/or diafiltration and/or precipitation.

11. The process according to claim 1,
  characterized in that
    the flour is subjected to several extraction steps with water, wherein at least one of the extraction steps is performed at pH values between 5.5 and 7 and subsequently another of the extraction steps is performed at pH values between 7.5 and 9.

12. The process according to claim 1,
  characterized in that
    the protein-containing flour is ground before the extraction to obtain a particle size distribution at which a percentage by mass of 90% of the particles has a particle size <100 μm.

13. The process according to claim 1,
  characterized in that
    the protein-containing flour is ground before the extraction to obtain a particle size distribution at which a percentage by mass of 90% of the particles has a particle size between 100 μm and 2500 μm.

14. The process according to claim 1,
  characterized in that
    the protein-containing flour provided has a residual content of a solvent used for the deoiling which is in the range between 0.001 and 0.4% by mass.

* * * * *